US005092044A

United States Patent [19]

Edgerton et al.

[11] Patent Number: 5,092,044

[45] Date of Patent: Mar. 3, 1992

[54] FLUID INJECTING NOSE SPROCKET FOR A CHAIN SAW GUIDE BAR

[75] Inventors: John L. Edgerton, Canby; Wesley L. Taylor, Oregon City, both of Oreg.

[73] Assignee: Blount, Inc., Portland, Oreg.

[21] Appl. No.: 687,063

[22] Filed: Apr. 18, 1991

[51] Int. Cl.[5] ........................ B23D 59/04; B27B 17/02

[52] U.S. Cl. ........................................ 30/123.4; 30/381

[58] Field of Search ..................... 30/123.3, 123.4, 381, 30/384, 387

[56] References Cited

U.S. PATENT DOCUMENTS

| | | | |
|---|---|---|---|
| 2,693,206 | 11/1954 | Anttonen | 30/123.4 |
| 2,708,810 | 6/1956 | Strunk | 30/123.4 |
| 4,341,017 | 7/1982 | Janczak | 30/381 |
| 4,361,960 | 12/1982 | Halverson | 30/123.4 |
| 4,722,141 | 2/1988 | Lim et al. | 30/381 |
| 4,947,550 | 8/1990 | Wenzel | 30/123.3 |

*Primary Examiner*—Douglas D. Watts
*Assistant Examiner*—Paul M. Heyrana, Sr.
*Attorney, Agent, or Firm*—Robert L. Harrington

[57] ABSTRACT

A guide bar for a chain saw having interior channels for conducting fluid to a nose end of the bar. The channel conducts fluid to the nose end of the bar where a sprocket is rotatably mounted. The sprocket has grooves formed in each side of its body for injecting fluid received from the center channel into the supporting bearing surface in the bore of the sprocket. The grooves are configured to inject fluid to the bearing surfaces regardless of the direction of sprocket rotation. The grooves which have open tops also provide for fluid flow between the side of the sprocket body and the side laminates of the sprocket nose. The grooves also provide an exit for fluid to flow out of the bearing surface as the grooves are positioned opposite the center channel as the sprocket is rotated. The flow of fluid through the grooves into the bearing area and the flow of fluid between the sprocket and the side laminates provides a hydraulic wall to prevent entry of contaminants into the sprocket.

8 Claims, 3 Drawing Sheets

FLUID INJECTING NOSE SPROCKET FOR A CHAIN SAW GUIDE BAR

BACKGROUND INFORMATION

1. Field of the Invention

This invention relates to guide bars for chain saws and in particular it relates to a guide bar having a nose sprocket that operates in a manner to receive a lubricating fluid and direct the fluid into and through the nose sprocket bearings.

2. Background of the Invention

Whereas the invention is beneficial to chain saws in general, it is particularly beneficial for aggregate cutting chain saws. Chain saws utilized to produce cuts in hard materials such as rock, stone, concrete and the like are subjected to very abrasive conditions. Lubrication is a major consideration and the invention provides improved lubrication.

Typically chain saws as contemplated herein have a power head with a drive sprocket, a guide bar for guiding an endless chain, and an endless chain. The guide bar is mounted to the power head in relation to the drive sprocket and the endless chain is entrained around the guide bar and drive sprocket. The chain is guided around the outer or nose end of the bar by an idling sprocket. This sprocket is referred to as a nose sprocket and the bar a sprocket nose bar.

The chain is an articulated chain having center drive links interconnected by pairs of side links. The center links have depending tangs that are engaged by the drive sprocket to propel the chain around the bar. The saw chain has special cutting elements mounted to certain of the links for producing a cut. Most often the cutting elements (for cutting abrasive materials) are a very hard material, such as industrial grade diamonds, embedded in a matrix.

As a cut is produced, the aggregate material is removed in the form of fine particles or fines that are very abrasive and cause rapid wearing when lodged between bearing surfaces. It is thus necessary to remove, or preferably to prevent entry of the particles between the bearing surfaces, i.e., between the components of the saw that move relative to each other such as the guide rails of the bar and the saw chain.

The guide bar is provided with an array of channels provided within the bar for transmitting a flushing, cooling and lubricating fluid to the guide grooves of the bar. Rather than a single opening to the guide groove, as is common in other applications, multiple ports are provided to the groove permitting a high volume of fluid to be dispensed along the length of the bar. The high volume of the fluid dispensed to the guide groove through the multiple ports will flush away any of the fines that enter between the chain and the rails, will cool the guide bar and chain and provide a lubrication of the guide bar and chain.

It is also desirable to flush out and lubricate the bearing surfaces of the nose sprocket. There is, however, a problem in providing fluid flow to the sprocket nose bearing. The nose sprocket is rotatably mounted in the nose end of the bar and is of course rotating during the cutting action. The rotating action of the sprocket inherently repels the fluid directed at its periphery which makes it difficult to provide fluid flow to the bearing at the center of the nose sprocket. It is thus not adequate merely to provide a fluid flow to the nose end of the guide bar.

BRIEF SUMMARY OF THE INVENTION

A preferred embodiment of the present invention is a guide bar having a sprocket rotatably mounted in a replaceable nose. The guide bar has multiple ported grooves formed in its interior for providing fluid flow to the guide grooves and a separate channel providing fluid flow to the nose end of the bar. The provision of separate channels enables the user to supply one fluid to the groove of the bar and the same or a different fluid to the nose of the bar. The fluid flowing through the channel to the nose end of the bar is injected into the sprocket nose bearing by multiple arcuate groove provided in the sides of the sprocket. The grooves are configured to function like circulating ramps. As the fluid enters the groove, because the grooves are curved inwardly and are rotating, the fluid is forced along the grooves and into the bearing area. Other features of the sprocket are that the grooves are provided for either direction of rotation and a large entry into the groove maximizes fluid flow to the nose sprocket bearing area and minimizes the interruption of the outer bearing race of the sprocket.

Other objects and advantages will be apparent from the drawings and the detailed description.

BRIEF DESCRIPTION OF THE DRAWINGS

FIGS. **4*a* and 4*b* are partial views of the sprocket of FIG. 2 shown in perspective.

DESCRIPTION OF THE PREFERRED EMBODIMENT

Figure 1:
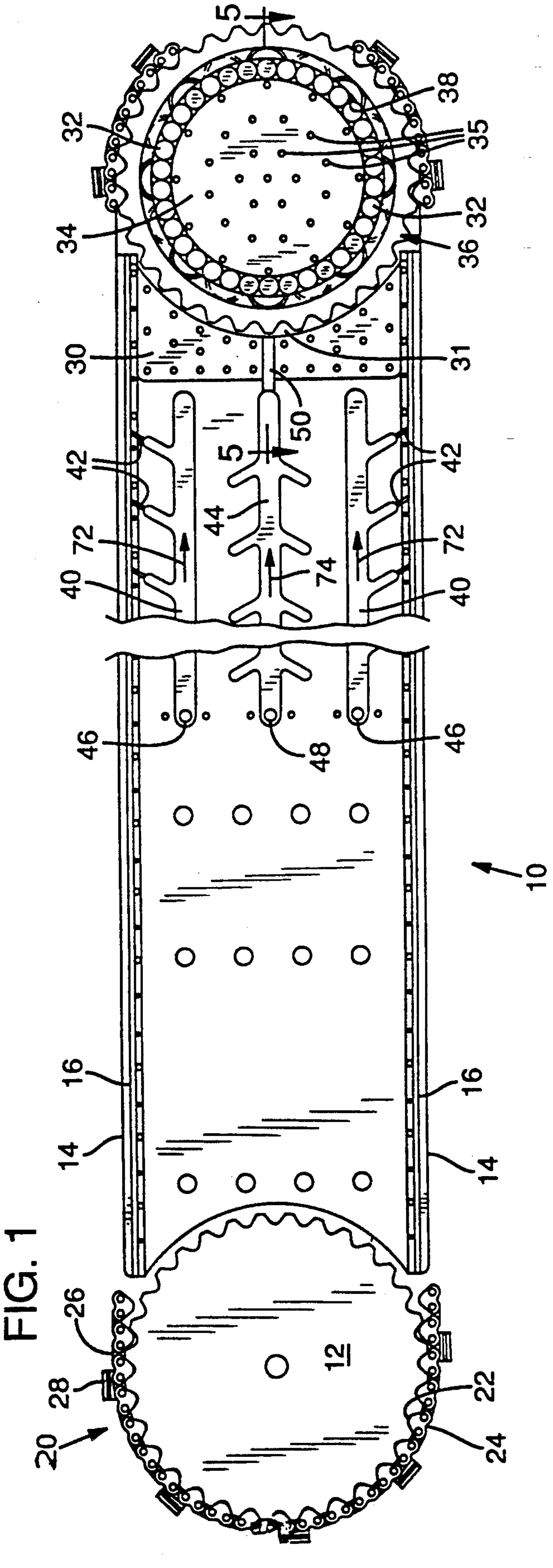
FIG. 1 is a sectional view of a chain saw guide bar of the present invention.
Figure 5:
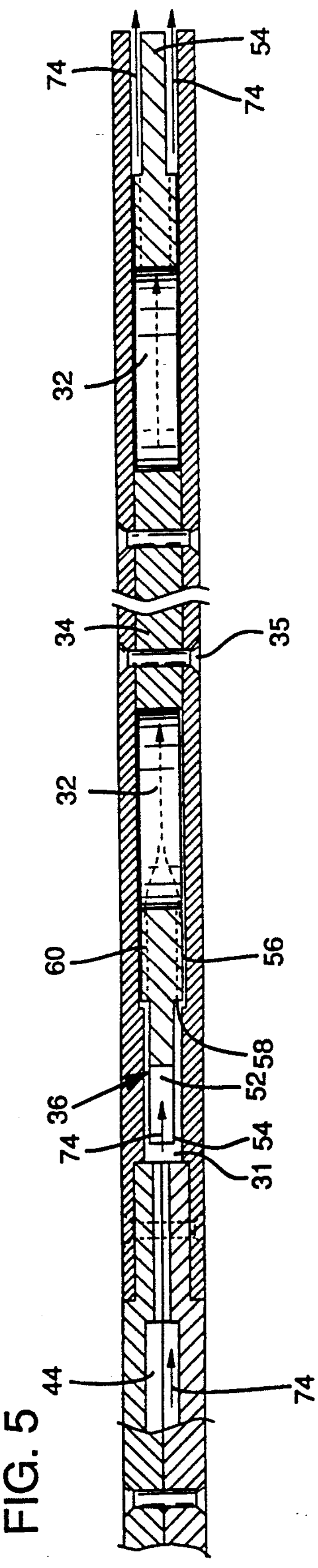
FIG. 5 is an enlarged sectional view of the nose end of the guide bar as taken on view lines 5—5 of FIG. 1** but without the saw chain.

A chain saw utilized to cut very hard material, such as rock or stone is subject to very abrasive conditions. The rock as it is cut is reduced to very fine particles (fines) of material. It is thus necessary to remove the fines produced, not only from the saw kerf but from the components of the saw. The chain saw guide bar of the present invention has channels formed in its interior for conducting a fluid, such as water, to flush the fines out of the saw kerf and the chain saw components, to lubricate the moving members of the saw and to provide a cooling medium.

Refer now to FIG. of the drawings. It illustrates a preferred embodiment of a laminated guide bar 10 suited for use in cutting hard materials. The guide bar depicted has replaceable bar rails 14 and a replaceable sprocket nose 30. However, the guide bar may be constructed in the more conventional manner without the replaceable components. The guide bar 10 is symmetrical and is mounted to a power head (not shown) in a conventional manner. The symmetry of the bar 10 permits reverse mounting of the guide bar to the power head in a conventional manner. Power heads are well known and therefore only the drive sprocket 12 of the power head is shown in relation to the guide bar 10.

The replaceable bar rails 14 of the guide bar 10 are fitted along the upper and lower length of the bar (as viewed in the figure) to each of the side laminates (plates) in a spaced relation to form a guide groove 16 for receiving the depending tangs 22 of the drive links 24 of the saw chain 20. The bar rails 14 also provide the supporting surface for supporting the side links 26 of the chain 20 in a conventional manner.

The replaceable sprocket nose 30 is fitted to the nose end of the bar. A sprocket 36 is rotatably mounted in the sprocket nose 30 on bearings 32. A disc 34 fixed between the side laminates (plates) of the sprocket nose 30 provides the inner race for the bearings 32 and the internal arc surface of a bore 38 of the sprocket 36 is the outer race for the bearings 32.

The guide bar 10 has interior side channels 40 for conducting a fluid to the grooves 16 of the guide bar 10 through multiple ports 42. A center interior channel 44 of the bar is for providing fluid to the nose end of the guide bar 10. The channels 40 and channel 44 are formed in the laminates of the bar 10. Each channel 40 has an entry 46 and the center channel 44 has an entry 48. The manifolding, associated valves and other apparatus that connect to the inlets 46 and 48 of the guide bar 10 to supply a flow of fluid are not shown since this technology and the apparatus is well known. The utilization of distinct channels does provide the user control over many variables such as the type of fluid, which channel or channels the fluid is to flow, the volume of flow and operating pressure to name a few.

The replaceable sprocket nose 30 is fitted to the nose end of the guide bar 10 by suitable multiple fasteners 35, such as rivets, as shown in FIG. 1.

An end 50 of the channel 44 connects to the cavity 31 of the sprocket nose 30. The nose sprocket 36 is received in the cavity 31 in which the sprocket 36 resides. Fluid flowing through the channel 4 will exit through end 50 and enter the cavity 31. 15 The nose sprocket 36 is rotatably mounted in the nose 30 on bearings 32. As previously stated, a disc 34 is the inner race and the arc surface of the bore 38 is the outer race for the bearings 32.

The nose sprocket 36 is further illustrated in FIGS. 2, 3, 4*a* and 4*b*. The sprocket 36 is a ring shaped disc like member having an outer body portion 52 concentric to an inner body portion 56. Teeth 54 for engaging the depending drive tangs 22 of the saw chain 20 are formed on the periphery of the outer body portion 52.

Figure 3:
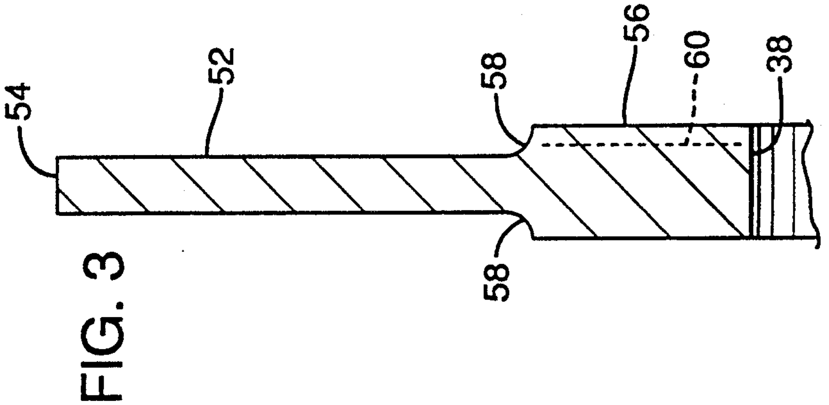
FIG. 3 is an enlarged sectional view of the sprocket as viewed on view lines 3—3 of FIG. 2.

The inner body portion 56 has the center through bore 38. The arc surface of the bore 38 provides an outer race for the bearings 32. As shown in FIG. 3, the outer body portion 52 is narrower in width than the inner body portion 56 and is centered relative to the inner body portion 56. A shoulder 58 which is the outer arc surface of the inner body portion 56 is thus defined on each side of the outer body portion 52.

Figure 2:
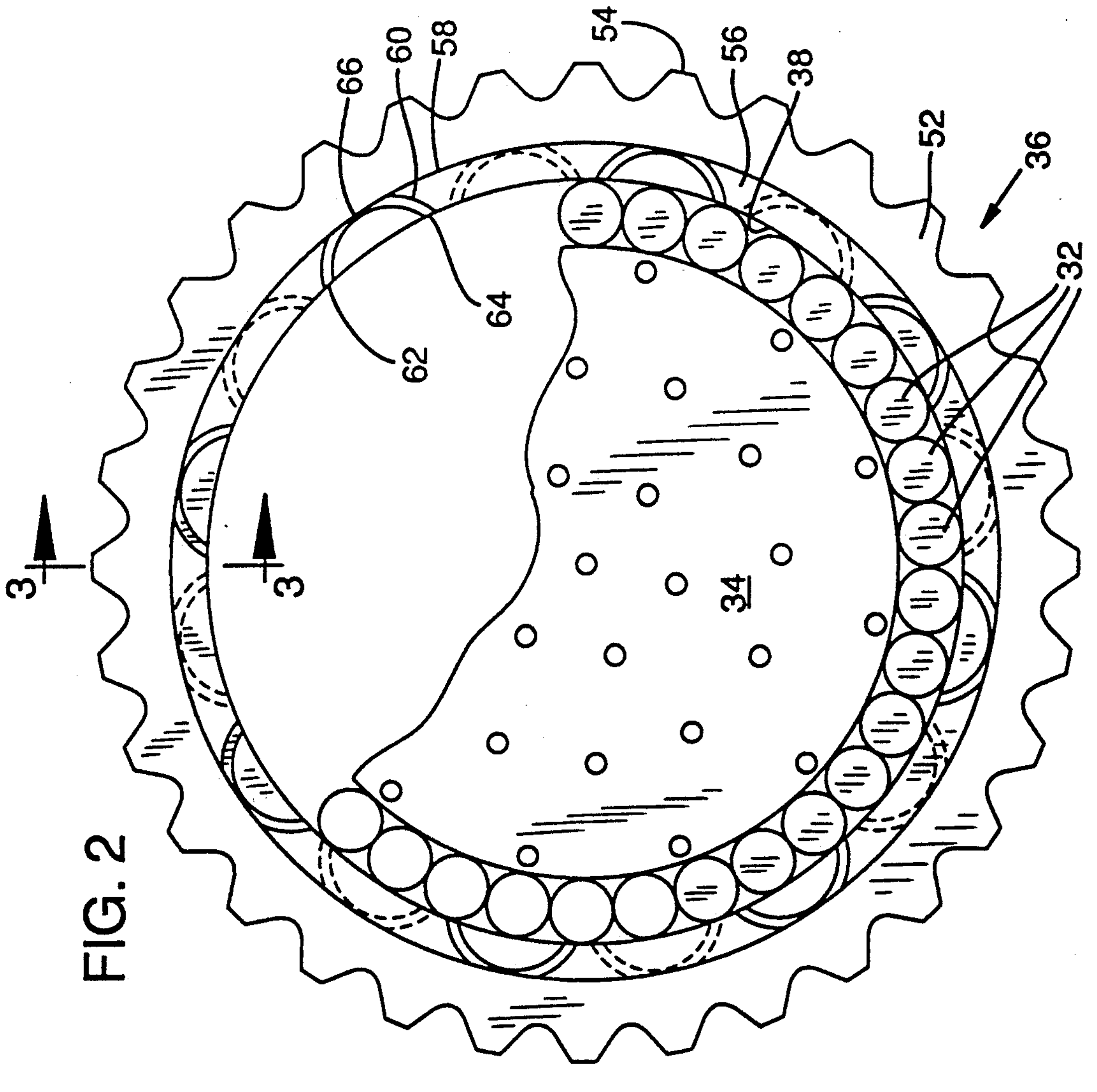
FIG. 2 is a view of a nose sprocket of the guide bar of FIG. 1.

Multiple arcuate grooves 60 (best seen in FIGS. 2, 4*a* and 4*b*) are provided at spaced intervals in each side of the inner body portion 56 of the sprocket 36 and at alternate rotative positions as will be noted by the dash line positions of the opposite grooves shown in FIG. 2. As illustrated, the groove 60 is somewhat semicircular with the ends 62 and 64 of the groove 60 open to the bore 38 of the inner body portion 56. A side opening 66 is provided at the apex of the groove 60 to provide for fluid entry to the groove. Note that the opening 66 (gate) to the groove 60 is wide with respect to the width of the groove 60. This provides a large entry for fluid to flow into and through the groove 60 to the bore 38 (and thus the bearings 32). The gate 66 also provides an exit for fluid to flow out of the bore 38 which will be explained.

The groove 60 is curved to extend on each side of the gate 66 (side opening) to form an arcuate groove to ramp the fluid in the manner described regardless of the direction of sprocket rotation. The curvature of the groove 60 is such that the entry (66) portion of apex of the groove 60 is near parallel to its arc of rotation. That is, the entry portion of the groove 60 is near parallel to the shoulder 58 formed on the inner body 56 portion of the sprocket 36. The groove 60 curves away from the shoulder 58 on each side of the entry 66 in an arcuate route with the exits 62, 64 opening to the bore 38 in a near radial attitude with respect to the sprocket center. The sprocket 36 is of course rotating during operation of the chain saw and may be rotated in either direction with respect to the bar 10. (The bar 10 is reversible and also the drive sprocket 12 may be driven in either direction.)

The arcuate grooves are preferable since they reduce the open span (i.e. width of exits 62, 64) created in the outer race (38) which the bearings 32 will traverse. The exits 62, 64 are dimensionally close to or the same as the width of the groove 60. A non-radial straight groove extended on either side of the entry 66 would have exits that are at a diagonal to the groove and thus create a larger open span in the outer race which the bearings must traverse.

Operation

Refer again to FIGS. 1, 4*a*, 4*b* and 5 of the drawings. Fluid such as water is introduced into the guide bar 10 through a suitable manifold connected to the inlet 46 of each channel 40 and to the inlet 48 to the channel 44. The fluid is forced through the channels under an operating pressure to insure fluid flow. A typical operating pressure is on the order of 40 PSI although the pressure will be adjusted to suit the condition. The fluid flow through the channels 40 is directed to the guide groove 16 through the multiple ports 42 as indicated by arrow 72. The channel 44 directs fluid flow through end 50 to the cavity 31 of the replaceable sprocket nose 30 as indicated by arrow 74.

The end 50 of the channel 44 connects to the cavity 31 of the sprocket nose 30 in which the sprocket 36 is mounted. Fluid flows through the channel end 50 of the channel 44 to the cavity 31 of the sprocket nose with the fluid flowing on both sides of the outer body portion 52 of the sprocket 36 (see FIG. 5). There is a space between each side of the outer body portion 52 and the side of the cavity 31.

Figure 4A:
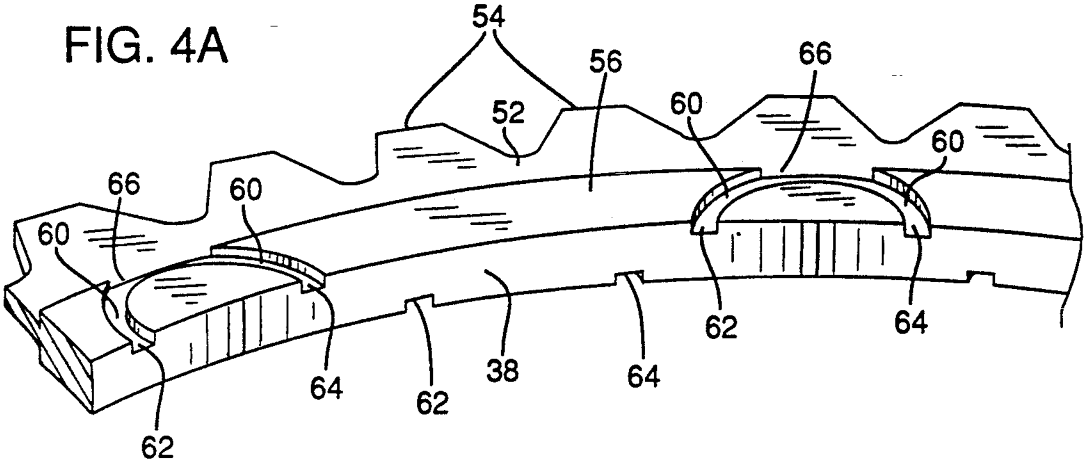
Figure 4B:
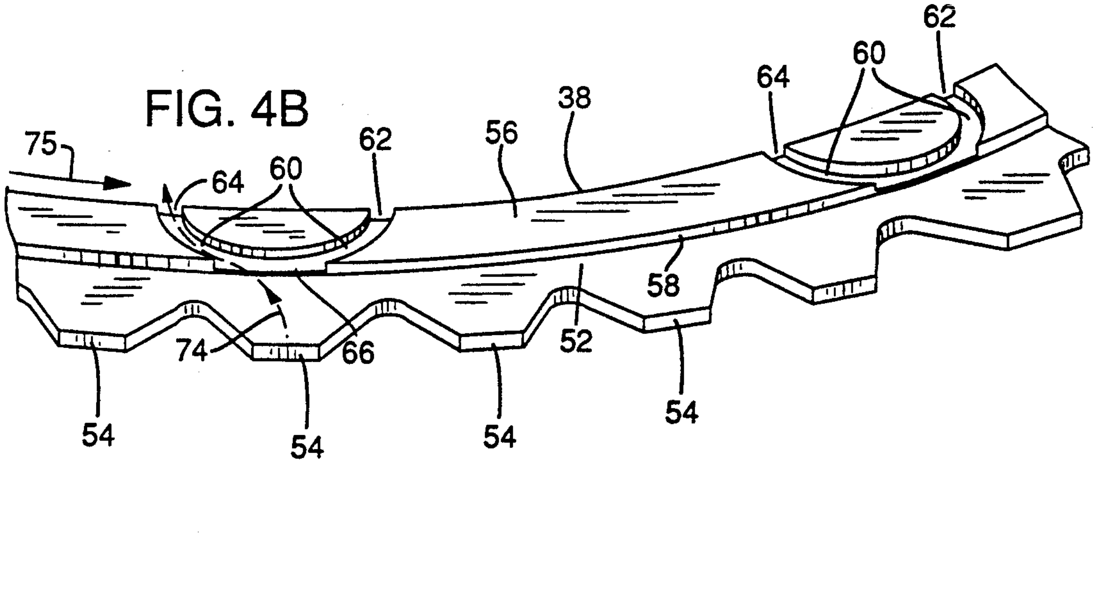

A portion of the fluid flow enters (as shown in FIG. 4*b* and indicated by arrow 74) into the grooves 60 through the gate (side opening) 66. The sprocket 36 is rotating as indicated by arrow 75 and the gates 66 of the grooves 60 are passing through the fluid flowing (arrow 74) into the nose sprocket cavity. As the gates 66 pass through the fluid flow, the fluid is "scooped" up by the gates 66 and the fluid enters the side of the grooves 60 that follows the direction of rotation, i.e., as indicated by arrow 74. The curvature of the groove 60 impels the fluid into the bore 38 of the sprocket where it flows around and through the bearings 32. The nose sprocket 36 is fitted in the sprocket nose in a "rotating fit" within the cavity 31. The sides of the inner body portion 56 are thus rotating in a close fit with the sides of the cavity 31.

The fluid flow is sufficient to fill the cavity 31 providing outwardly directed fluid flow and thus a hydraulic wall (barrier) to prevent entry of any fines into the confines of the sprocket nose 30 and thus the bearing 32.

As the sprocket rotates, the grooves 60 are of course moving. As the grooves move to a position opposite the end 50 of channel 44, the grooves 60 become exits for fluid to flow out of the bearings 32. The fluid flowing out of the grooves 60 also aids in flushing fines out and away from the saw chain that is entrained on this portion of the nose sprocket 36.

It will be apparent to those skilled in the art that modifications may be made to the preferred embodiment without departing from the true spirit and scope of the invention. For example, while the preferred embodiment is illustrated and described as having replaceable guide rails and sprocket nose, the bar may be of conventional design where the guide groove is produced in the side laminates of the bar and the sprocket is rotatably mounted in the nose end of the bar instead of in a replaceable sprocket nose. The invention may be embodied in a conventional wood cutting saw with the lubricating fluid being oil. Accordingly the invention encompasses chain saws in general in accordance with the definition of the claims appended hereto.

We claim:

1. A chain saw guide bar for guiding an entrained saw chain, comprising;

a flat elongate bar, one end of the bar adapted for mounting said bar to a power head and an opposite end of said bar defining a nose end, said bar having a channel formed therein for conducting a fluid to the nose end of the bar;

means for providing flow of fluid through said channel to said nose end of the bar;

said nose end configured to have spaced apart side plates, a sprocket rotatably mounted in the nose end of the bar between the side plates, said sprocket having teeth extending from a body portion having sides and a central bore defining an outer race, a member within the bore defining an inner race, and bearing surfaces between said inner and outer race, and the improvement which comprises;

arcuate grooves formed in a side of the body portion, said grooves having an entry open to the flow of fluid from said channel and extending rearwardly and inwardly relative to the rotation of the sprocket toward the bearing surfaces for receiving and impelling the fluid to said bearing surfaces as a result of being rotated.

2. A chain saw guide bar as defined in claim 1 wherein said grooves are curved from a rotative directed entry substantially parallel to an arc of rotation to a substantially radially directed exit.

3. A chain saw guide bar as defined in claim 1 wherein said grooves are provided on both sides of said body and in alternating rotative positions to alternately direct fluid from one side and then the other as the sprocket rotates past the channel.

4. A chain saw guide bar as defined in claim 1 wherein the sprocket may rotate in either of two directions and wherein said grooves are extended in both of said directions to accommodate either direction of rotation.

5. A chain saw guide bar as defined in claim 1 wherein the fluid flow is sufficient to provide fluid flow under pressure surrounding the sprocket bearing surfaces and provide a barrier to the entry of fine particles.

6. A chain saw guide bar as defined in claim 1 wherein the chain saw is an aggregate cutting chain saw and the fluid is water for cooling, lubricating and flushing bearing surfaces of the chain saw.

7. A chain saw guide bar as defined in claim 1 wherein the fluid is oil for lubricating the bearing surfaces of the nose sprocket.

8. A chain saw guide bar as defined in claim 1 wherein the body portion of the sprocket has an inner body portion and an outer body portion from which the sprocket teeth are extended, said inner body portion sized to fit closely to the side plates and said outer body portion and teeth having a width narrower than the inner body portion and spaced from both side plates, said grooves formed on the sides of the inner body portion with fluid flow directed to said groove entries through the spaces at the sides of said teeth and outer body portion.

* * * * *